(12) United States Patent
Chiou et al.

(10) Patent No.: US 7,900,220 B2
(45) Date of Patent: Mar. 1, 2011

(54) SLOT-IN DISK DRIVE DEVICE

(75) Inventors: Yao-Jia Chiou, Taoyuan (TW); Yao-Ching Tsai, Taoyuan (TW); Yao-Ting Kuo, Taoyuan (TW); Jen-Chen Wu, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 873 days.

(21) Appl. No.: 11/889,090

(22) Filed: Aug. 9, 2007

(65) Prior Publication Data
US 2008/0052731 A1 Feb. 28, 2008

(30) Foreign Application Priority Data
Aug. 24, 2006 (TW) .............................. 95131268 A

(51) Int. Cl.
*G11B 17/04* (2006.01)
(52) U.S. Cl. ..................................... 720/622
(58) Field of Classification Search .................. 720/622
See application file for complete search history.

(56) References Cited

U.S. PATENT DOCUMENTS

| | | | |
|---|---|---|---|
| 7,013,471 B2* | 3/2006 | Yoshimura | 720/620 |
| 7,028,316 B2* | 4/2006 | Kim et al. | 720/621 |
| 7,065,773 B2* | 6/2006 | Azai | 720/622 |
| 7,302,695 B2* | 11/2007 | Lee et al. | 720/622 |
| 7,487,520 B2* | 2/2009 | Omori et al. | 720/706 |

* cited by examiner

*Primary Examiner*—Mark Blouin
(74) *Attorney, Agent, or Firm*—Bacon & Thomas, PLLC

(57) ABSTRACT

A slot-in disk drive device has a drive unit for providing power to move a slider and thus a sliding plate attached to the slider. Guiding slots on the sliding plate rotate a transmission bar. A guide pin is disposed on the transmission bar and moves with a loading stick. One end of a receiving bar is formed with a locking slot. A substrate having inclined slots arranged in parallel and used for guiding the receiving bar. A locking member mounted on the disk drive device has a stopper edge located on moving path of projecting guide pin of the transmission bar and a locking pin. One end of a pulling spring is fixed to the locking member so that the locking pin locks with the locking slot. One end of a restoring bar is mounted on the substrate, and a restoring torsion spring supports and restores the receiving bar.

18 Claims, 13 Drawing Sheets

US 7,900,220 B2

SLOT-IN DISK DRIVE DEVICE

This application claims the benefit of Taiwan application Serial No. 95131268, filed Aug. 24, 2006, the subject matter of which is incorporated herein by reference.

BACKGROUND OF THE INVENTION

1. Field of the Invention

The invention relates in general to a slot-in optical drive, and more particularly to an apparatus for determining and guiding discs of different sizes to be loaded and ejected in a slot-in disk drive device.

2. Description of the Related Art

Typical disk drive devices may be mainly classified into a tray type disk drive device and a slot-in disk drive device. The tray type disk drive device has a tray for supporting a disc, and the tray is pushed into or slides out of the disk drive device so that the disc reaches a specific position or is ejected. The disc only has to be directly inserted into an inlet of the slot-in disk drive device, and the loading/ejecting mechanism can automatically suck the disc in and guide the disc to the positioning position in a convenient manner. In addition, no tray is needed, and the device can be thinned more easily.

However, discs of different sizes cannot be embedded with a spindle motor for rotating the disc correctly until the disc reach a playing position in the disk drive device without error, or otherwise the optical disc is jammed in the disk drive device. Thus, the device tends to have an error, or even the disc and the disk drive device tend to be damaged. Multiple sliding plates, guiding rods and bar-linkage mechanisms are utilized to guide the discs of different sizes for positioning and loading/ejecting in prior arts. However, the guiding rod and the bar-linkage mechanism have to successively guide the disc to be aligned with the spindle motor, and the loading/ejecting mechanism is too complicated. Also, the disc cannot be always kept horizontal via the peripheral point contacting to guide the disc. Thus, when the foreign object or disc is being loaded, other switches corresponding to other sizes of discs may be touched and the determination error of the disc size may occur to cause the malfunction of the transmission mechanism and thus to cause the disk drive device to have the error. Thus, the conventional apparatus and method of the slot-in disk drive device for loading and ejecting the disc still have problems to be solved.

The invention will become apparent from the following detailed description of the preferred but non-limiting embodiments. The following description is made with reference to the accompanying drawings.

SUMMARY OF THE INVENTION

The invention is directed to a disk drive device having a receiving bar that can be fixed at positions stepwise so that different sizes of discs can be determined and can be guided and thus positioned, the error rate can be reduced, and the reliability of the optical drive can be ensured.

According to the present invention, a slot-in disk drive device is provided. A drive unit provides power to move a slider and thus a sliding plate fixed to the slider. Guiding slots on the sliding plate rotate a transmission bar. A guide pin is disposed on the transmission bar and moves with a loading stick. One end of a receiving bar is formed with a locking slot. A substrate is formed with a plurality of inclined slots arranged in parallel and used for guiding the receiving bar to slide. A locking member rotatably mounted on the disk drive device has one end formed with a stopper edge located on a moving path of another projecting guide pin of the transmission bar, and the other end formed with a locking pin. One end of a pulling spring is fixed to the locking member so that the locking pin locks with the locking slot. One end of a restoring bar is rotatably mounted on the substrate, and a restoring torsion spring supports and restores the receiving bar.

The invention will become apparent from the following detailed description of the preferred but non-limiting embodiments. The following description is made with reference to the accompanying drawings.

DETAILED DESCRIPTION OF THE INVENTION

Figure 1:
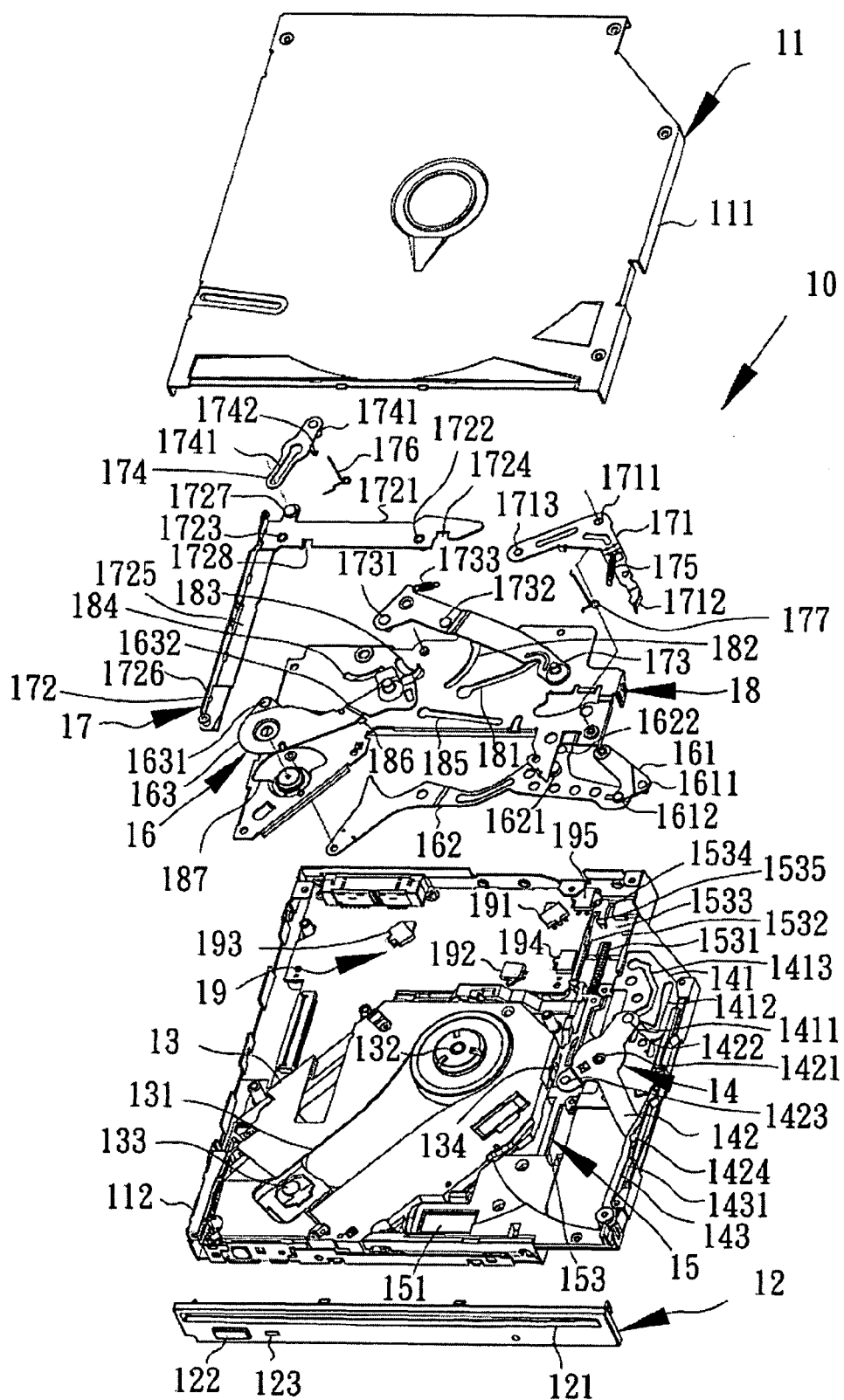
FIG. 1 is an exploded view showing components of a slot-in disk drive device according to the invention.

FIG. 1 is an exploded view showing components of a slot-in disk drive device according to the invention. Referring to FIG. 1, a slot-in disk drive device 10 of the invention includes a casing 11, a panel 12, a traverse 13, a loading unit 14, a drive unit 15, an ejecting unit 16, a receiving unit 17, a substrate 18 and a sensing unit 19. The ejecting unit 16 and the receiving unit 17 actuate the sensing unit 19 to sense a disc D (see FIG. 4) inserted into the disk drive device 10, and enable the drive unit 15 to move the loading unit 14 to push the disc D into the disk drive device 10, and further move the receiving unit 17 to guide the disc D to a predetermined position. Then, the traverse 13 rises to embed with the disc, rotates the disc D and then plays the disc or ejects the disc.

The casing 11 is composed of an upper case 111 and a lower case 112, which cover a hollow space for accommodating a disc drive mechanism for driving the disc D into and out of the casing 11. The panel 12 is disposed at a front end of the casing 11, and is formed with a long-slot-like disc inlet/outlet 121. An ejecting button 122 is disposed on the panel 12 and below the inlet/outlet 121, and the ejecting button 122 is to be pressed so that the disc D is ejected. An indicator 123 is disposed on the panel 12 and near the ejecting button 122 to indicate an operation condition of the disk drive device 10.

The traverse 13 tilts to a corner from a center of the disk drive device 10 and is disposed near a front end of the lower case 112. A shaft of the traverse 13 is formed with a longitudinal fixed slot 131. A spindle motor 132 for rotating the disc D is disposed at one end of the fixed slot 131 near the center of the disk drive device 10. A pickup head 133 slides along the other portion of the fixed slot 131 to read data on the disc D or write the data to the disc D. A projecting sliding pin 134 is disposed on a lateral side of the spindle motor 132 near the traverse 13.

Figure 2:
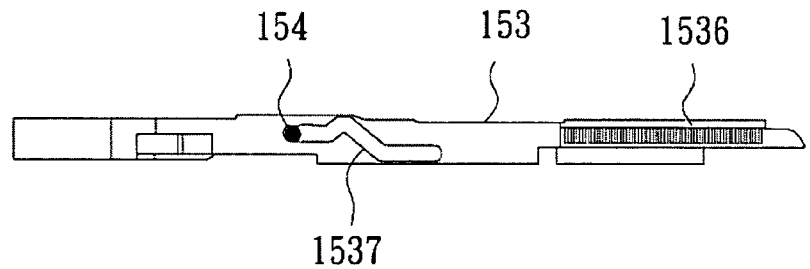
FIG. 2 shows a side surface of a slider of the invention.

The drive unit 15 is disposed on a lateral side of the traverse 13 to provide a power source. A driving motor 151 disposed on the front end of the disk drive device 10 rotates a gear set 152 (see FIG. 3) to drive a slider 153, extending to a rear end, to slide back and forth. An ejecting spring 1531 is fixed to the slider 153. The other end of the ejecting spring 1531 pushes a slidable ejecting slider 1532. The ejecting slider 1532 and the rear-end wall of the slider 153 form a first sliding slot 1533, which extends backward to form a second sliding slot 1534 and a third sliding slot 1535 that connect the first sliding slot 1533. As shown in FIG. 2, a rack 1536 driven by the gear set 152 is disposed at the front end of the side surface of the slider 153, and a lifting slot 1537 is formed near a middle of the side surface of the slider 153 so that the sliding pin 134 of the traverse 13 can be embedded and slide therein and the sliding pin 134 slides back and forth with the movement of the slider 153 to move up and down relative to the lifting slot 1537.

Figure 3:
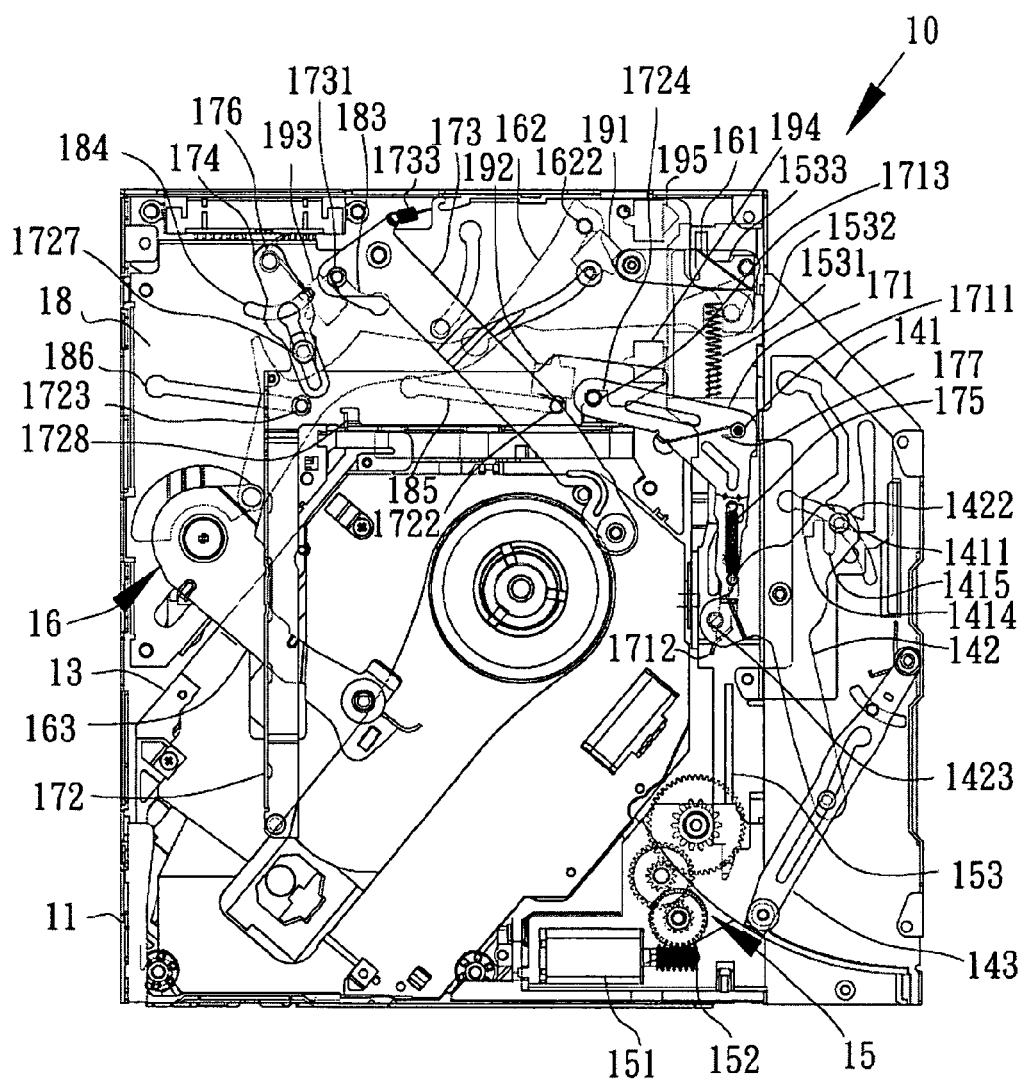
FIG. 3 is a top view showing a slot-in disk drive device of the invention in an initial state.

The loading unit 14 is disposed on the other side of the drive unit 15 opposite to the traverse 13, and mainly includes a sliding plate 141, a transmission bar 142 and a loading stick 143. One side of the sliding plate 141 is fixed to the slider 153 and the sliding plate 141 slides along the lower case 112 with the movement of the slider 153. A first guiding slot 1411 is formed on the sliding plate 141 and extends backward to form both a second guiding slot 1412 and a third guiding slot 1413, which connect the first guiding slot 1411, and additionally extends forward to form a shorter fourth guiding slot 1414 and a shorter fifth guiding slot 1415, as shown in FIG. 3. The transmission bar 142 is a Y bar having a center 1421 fixed to the lower case 112. The Y bar has a first end fixed to a first guide pin 1422, which projects downward and is embedded into the first guiding slot 1411, a second end fixed to a second guide pin 1423, which projects downward and is suspended above the slider 153, and a third end fixed to a third guide pin 1424 projecting downward. One end of the loading stick 143 is fixed to a lateral side of the lower case 112, and a longitudinal slot 1431 is formed along the axial direction. The third guide pin 1424 is embedded into the longitudinal slot 1431 and may slide therein to rotate the loading stick 143.

In addition, the sensing unit 19 is composed of a first sensing switch 191, a second sensing switch 192, a third sensing switch 193, a fourth sensing switch 194 and a fifth sensing switch 195. Each of the sensing switches may be a limit switch. The sensing unit 19 is dispersed on a back side of the lower case 112. The fourth sensing switch 194 and the fifth sensing switch 195 are attached to the rear lateral side of the slider 153 to respectively sensing end points of disc loading and ejecting so as to cut off the power source of the drive unit 15. The first sensing switch 191, the second sensing switch 192 and the third sensing switch 193 work in conjunction with the ejecting unit 16 and the receiving unit 17. The size of the disc D that is pushed into the device is determined according to the order of switching the switches, and the details will be described in the following.

The substrate 18 is spreaded over a rear upper side of the disk drive device 10 to cover the sensing unit 19 and the rear side of the slider 153. The substrate 18 is separately formed with a first arc slot 181, a second arc slot 182, a third arc slot 183, a fourth arc slot 184, a first inclined slot 185 and a second inclined slot 186. A fan-shaped slot 187 is formed at a corner of the substrate 18.

In addition, as shown in FIGS. 1 and 3, the receiving unit 17 is composed of a locking member 171, a receiving bar 172, a positioning bar 173, a restoring bar 174, a tension spring 175, a restoring torsion spring 176 and a pulling spring 177. A rotation center 1711 of the L-shaped locking member 171 and the pulling spring 177 are fixed to the substrate 18 disposed above the slider 153. One end of the locking member 171 is formed with a stopper edge 1712 projecting upward, and is suspended above a moving path of the second guide pin 1423 of the transmission bar 142. The other end of the locking member 171 is formed with a projecting locking pin 1713. One end of the pulling spring 177 is fixed to a periphery of the locking member 171 so that the end of the locking pin 1713 is kept in a state of facing the center of the disk drive device 10. One end of the tension spring 175 is fixed to the end of the stopper edge 1712 of the locking member 171 and substantially penetrates through the rotation center 1711 to reduce the influence on the rotation of the locking member 171. The other end of the tension spring 175 is fixed to the transmission bar 142 so that the transmission bar 142 drives the receiving end of the loading stick 143 and extends toward the front end of the disk drive device 10.

The receiving bar 172 also has an L-shape and is disposed on the substrate 18 and on an opposite side opposite to the locking member 171. A first guiding pin 1722 and a second guiding pin 1723 are disposed on a first extending side 1721 of the receiving bar 172 extending to the center of the disk drive device 10, and are respectively embedded into the first inclined slot 185 and the second inclined slot 186. Thus, the receiving bar 172 slides transversely along the first inclined slot 185 and the second inclined slot 186. When the first guiding pin 1722 penetrates through the first inclined slot 185, the first guiding pin 1722 can just actuate the second sensing switch 192 on the moving path of the first guiding pin 1722. A small projection 1728 is formed near the front end of the first extending side 1721, and a locking slot 1724 is formed at the distal end of the first extending side 1721. Another second extending side 1725 of the receiving bar 172 is parallel to the lateral side of the disk drive device 10, and is formed with a flange 1726 to guide the disc D. A slide fastener 1727 extends around the center of the receiving bar 172. One end of the restoring bar 174 is rotatably mounted on the substrate 18 near the slide fastener 1727. The restoring bar 174 is formed with a moving slot 1741 into which the slide fastener 1727 is embedded. A projecting plate 1742 extends from the lateral side of the restoring bar 174 and penetrates through the fourth arc slot 184. The projecting plate 1742 is pressed by the restoring torsion spring 176 disposed below the substrate 18 so that the height of the casing can be reduced and the receiving bar 172 restores toward the disk drive device 10.

One end of the positioning bar 173 is rotatably mounted on a middle rear side of the substrate 18, and the periphery of the positioning bar 173 is formed with a first triggering pin 1731, which projects downward and penetrates through the third arc slot 183 to actuate the third sensing switch 193 disposed nearby. The other end of the positioning bar 173 extends forward neighboring to the spindle motor 132. The middle portion of the positioning bar 173 is formed with a branch pin 1732, which projects downward and is embedded into the second arc slot 182 so that the branch pin 1732 can slide in the second arc slot 182 and the supporting intensity of the positioning bar 173 can be enhanced. A restoring pulling spring 1733 is also disposed neighboring to the fixing end of the positioning bar 173, and has one end fixed to the positioning bar 173 and the other end fixed to the substrate 18.

The ejecting unit 16 includes a first link 161, a second link 162 and an ejecting bar 163. The first link 161 and the second link 162 are disposed below the substrate 18, while the ejecting bar 163 is disposed above the substrate 18. The first link 161 has one end rotatably mounted on the bottom side of the substrate 18, and the other end formed with a first driving pin 1611 and a second driving pin 1612, which project downward. The first driving pin 1611 is embedded into the first sliding slot 1533 of the slider 153 and is driven by the slider 153. The second link 162 is transversely disposed on the bottom side of the substrate 18, and has one end connected to the second driving pin 1612 and the other end extending to the bottom of the fan-shaped slot 187 of the substrate 18. A projecting guiding pin 1621 is formed on the vicinity of the middle of the second link 162 and is embedded into the first arc slot 181 to guide and support the second link 162 to move therewith. A second triggering pin 1622, which projects downward, is formed on neighboring to the guiding pin 1621, and can actuate the neighboring second sensing switch 192. One end of the ejecting bar 163 is rotatably mounted on a middle top side of the fan-shaped slot 187, and the periphery of the fixed end of the ejecting bar 163 is formed with a fixing pin 1631 projecting downward. The fixing pin 1631 penetrates through the fan-shaped slot 187, and is pivotally connected to one end of the second link 162. Thus, the power of the drive unit 15 rotates the ejecting bar 163 through the first link 161 and the second link 162, and the other end of the ejecting bar 163 extends slantingly toward the vicinity of the spindle motor 132. A bend 1632 is formed near the middle portion of the ejecting bar 163.

As shown in FIG. 3, the disk drive device 10 is in a state when no disc is loaded. The slider 153 is located near the backside of the casing 11, makes the fifth sensing switch 195 in an OFF state and makes the fourth sensing switch 194 in an ON state. Also, the sliding plate 141 is disposed on the backside so that the transmission bar 142 enables the first guide pin 1422 to engage into the first guiding slot 1411 tightly and slidably, and the receiving end of the loading stick 143 to half extend toward the inner side of the disk drive device 10 under the action of the tension spring 175. Meanwhile, the locking member 171 also enables the locking pin 1713 to engage into the locking slot 1724 of the receiving bar 172 under the action of the pulling spring 177, and keeps the receiving bar 172 at the position near the inner side of the disk drive device 10 when the restoring bar 174 is pressed by the restoring torsion spring 176. Also, the first guiding pin 1722 makes the second sensing switch 192 in the ON state. In addition, the positioning bar 173 is pulled by the restoring pulling spring 1733 so that one end of the positioning bar 173 extends forward to the vicinity of the spindle motor 132, and the first triggering pin 1731 thereof actuates the third sensing switch 193 to be in the ON state. The first driving pin 1611 of the first link 161 of the ejecting unit 16 lets the second link 162 make one end of the ejecting bar 163 extend slantingly toward the vicinity of the spindle motor 132, and lets the second triggering pin 1622 of the second link 162 actuate the first sensing switch 191 to be in the ON state under the limitation of the first sliding slot 1533 of the slider 153.

Figure 4:
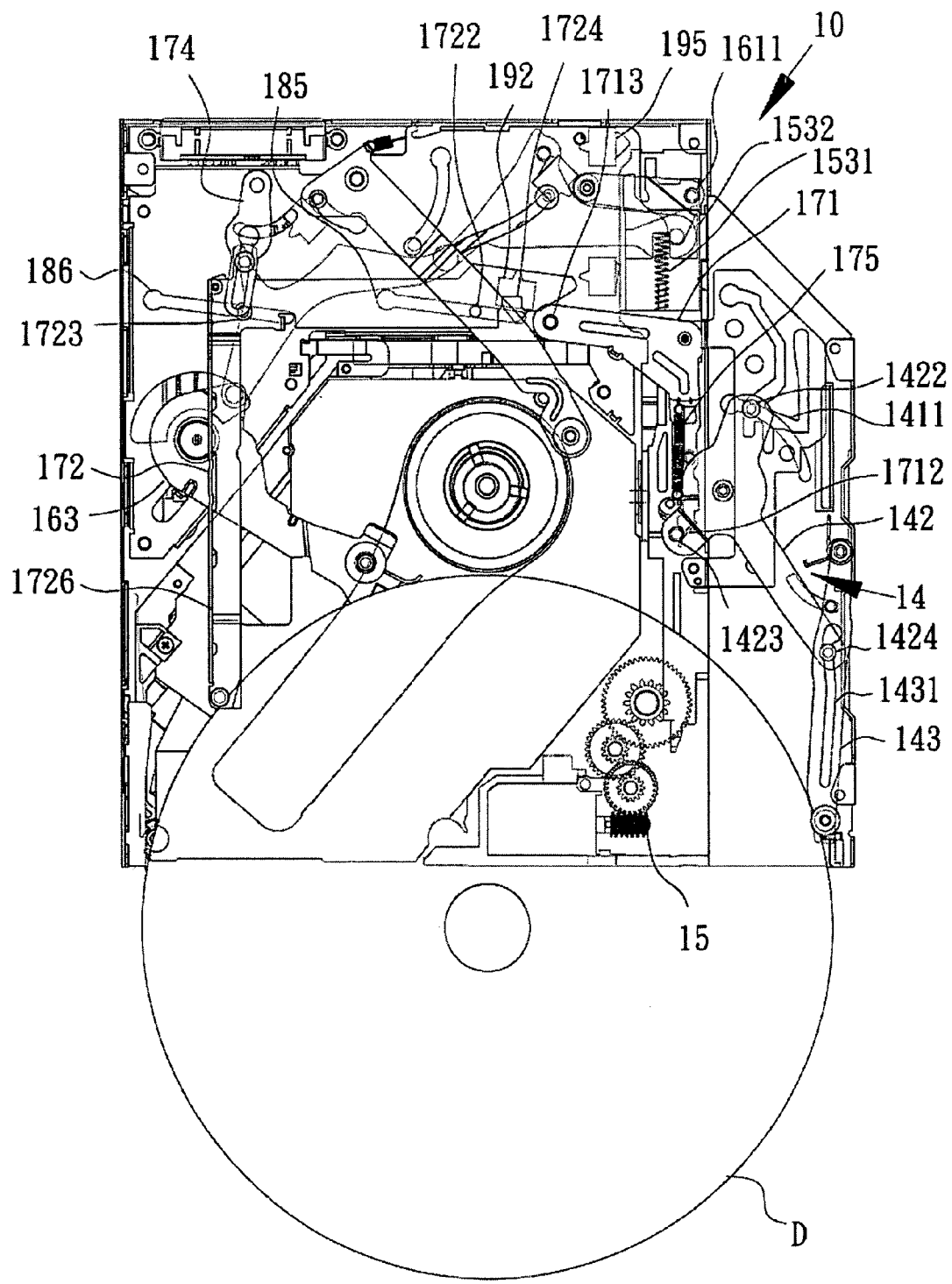
FIG. 4 is a top view showing a large-sized disc, which is loaded into the device of the invention to push a locking member away.

As shown in FIGS. 4 to 7, the disk drive device 10 of the invention drives and guides the large-sized disc D having the diameter of 12 cm, for example, to be loaded and ejected. As shown in FIG. 4, when the large-sized disc D is inserted into the disk drive device 10, one side of the disc D pushes against the lateral side of the disk drive device 10 because the width of the disk drive device 10 is slightly larger than the diameter of the large-sized disc D. The other side of the disk drive device 10 is pushed by the user to contact the loading unit 14 first, and to push the receiving end of the loading stick 143. Thus, the loading stick 143 is gradually opened laterally to move the longitudinal slot 1431 to move the third guide pin 1424 to slide and to actuate the transmission bar 142 to resist the rotation of the tension spring 175. As a result, the first guide pin 1422 slides along the first guiding slot 1411, while the second guide pin 1423 is rotated to push the projecting stopper edge 1712 of the locking member 171 so that the locking member 171 resists the rotation of the pulling spring 177 (see FIG. 3) and the locking pin 1713 is moved away from the locking slot 1724 of the receiving bar 172. Then, the projecting flange 1726 of the receiving bar 172 is pushed by the inserted disc D to resist the restoring bar 174, and the first guiding pin 1722 and the second guiding pin 1723 are moved in parallel toward the lateral side of the disk drive device 10 along the first inclined slot 185 and the second inclined slot 186. Meanwhile, the first guiding pin 1722 is moved away from the second sensing switch 192 such that the second sensing switch 192 is in the OFF state.

Figure 5:
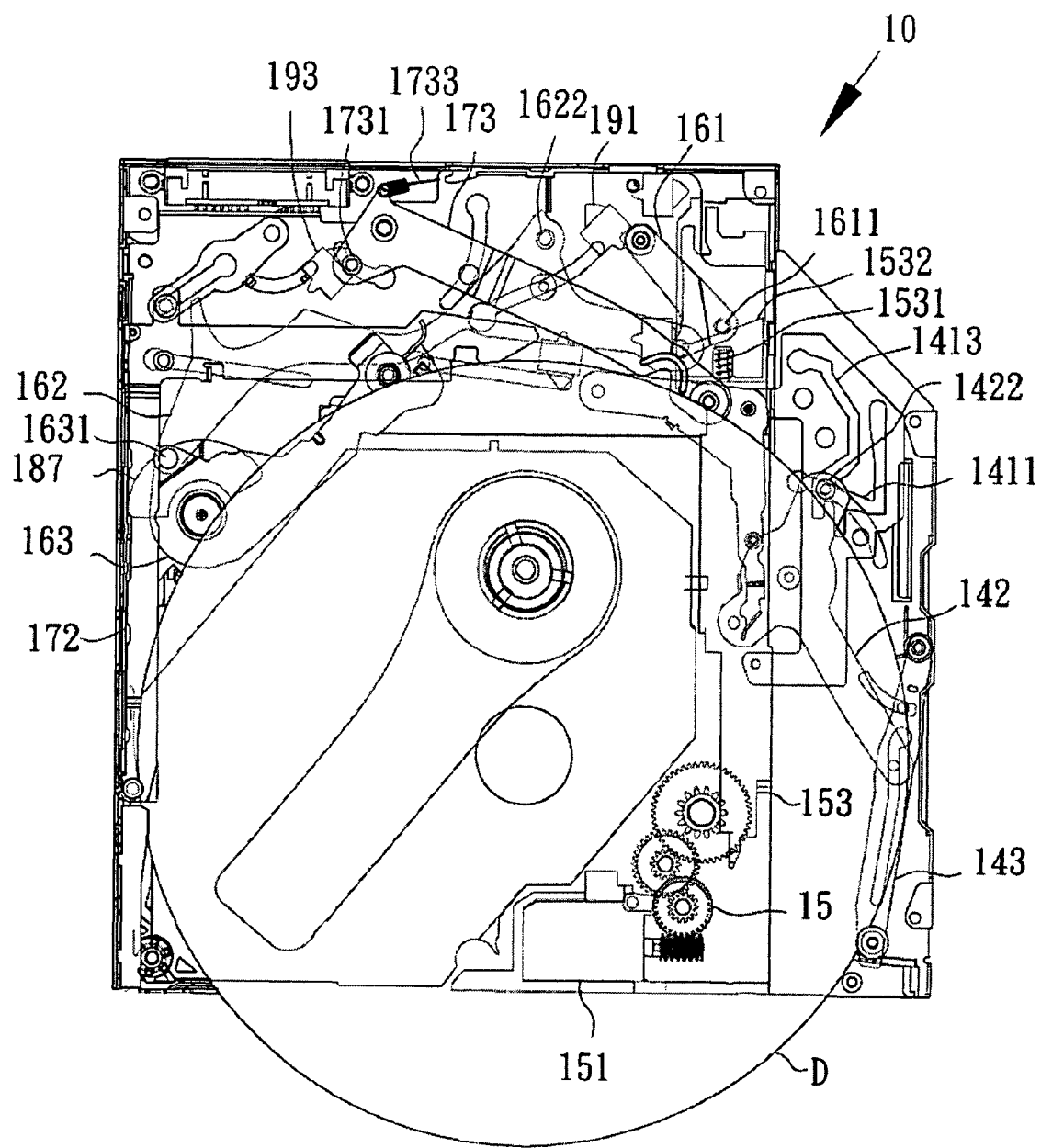
FIG. 5 is a top view showing that a driving motor is enabled to guide the large-sized disc.

When the disc D continues to be inserted, as shown in FIG. 5, the disc D pushes the loading stick 143 to move toward the lateral side continuously to rotate the transmission bar 142, so that the first guide pin 1422 slides to the third guiding slot 1413 along the first guiding slot 1411. While the receiving bar 172 is pushed by the inserted disc D to gradually move toward the lateral side, the circumference of the deep side of the disc D pushes the much more projected receiving end of the ejecting bar 163 to rotate the ejecting bar 163. The fixing pin 1631 penetrating through the fan-shaped slot 187 moves the second link 162 so that the first driving pin 1611 of the first link 161 pushes the slider 1532 against the ejecting spring 1531 to rotate the first link 161 and thus to move the second link 162 when the slider 153 does not move yet. Thus, the second triggering pin 1622 of the second link 162 is moved away from the first sensing switch 191 such that the first sensing switch 191 is in the OFF state. When the first sensing switch 191 and the second sensing switch 192 are in the OFF states, it is determined that the large-sized disc D has been loaded. Next, the disc D pushes back the deeper receiving end of the positioning bar 173 so that the positioning bar 173 resists the pulling force of the restoring pulling spring 1733 and is rotated backward, and the first triggering pin 1731 is moved away from the third sensing switch 193 such that the third sensing switch 193 is in the OFF state. When the first sensing switch 191 and the second sensing switch 192 are in the OFF states and the third sensing switch 193 is in the OFF state, it represents that the receiving end of the loading stick 143 has reached the outer circumference of the large-sized disc D, and the disk drive device 10 immediately enables the driving motor 151 to enable the drive unit 15.

Figure 6:
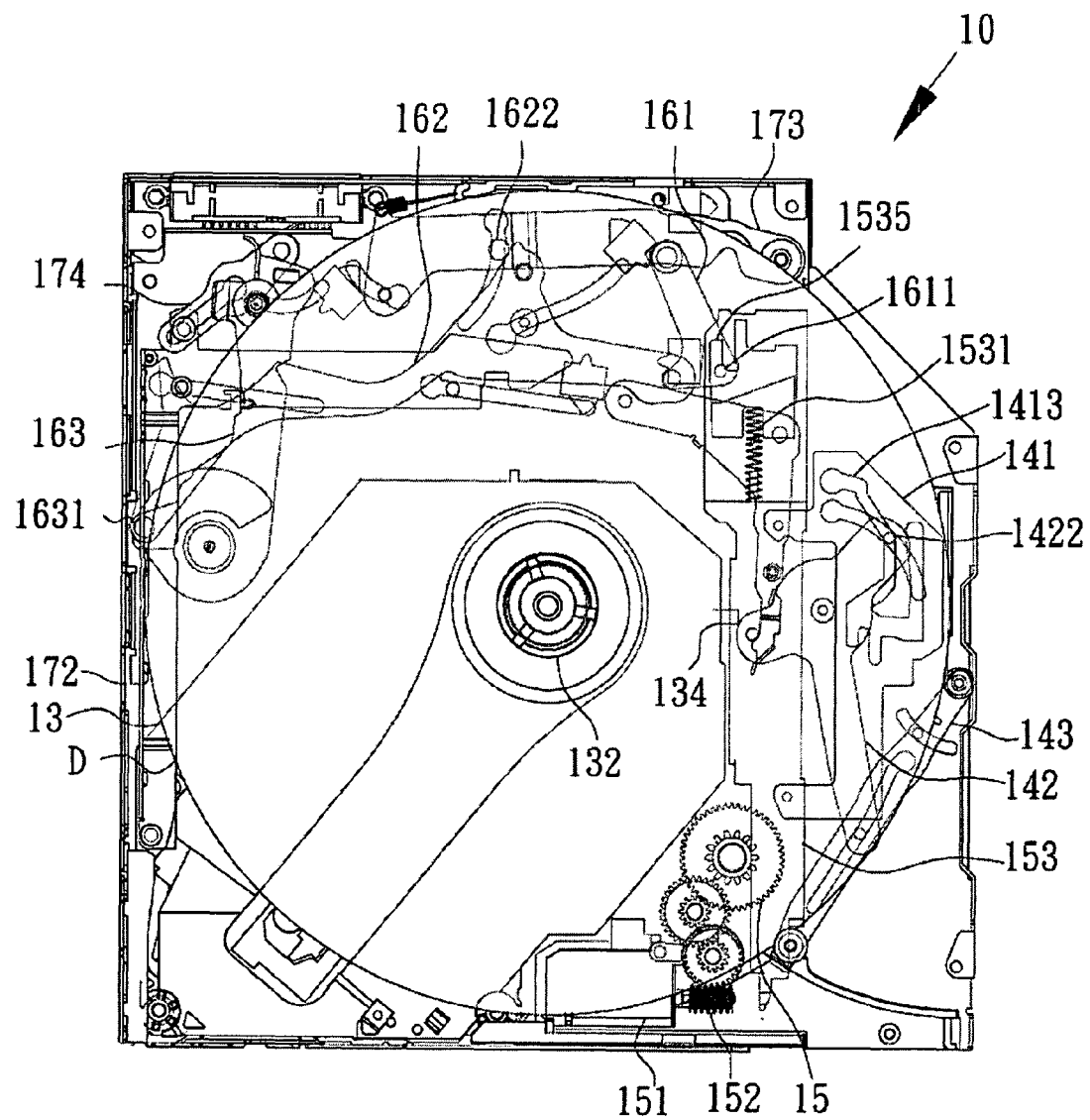
FIG. 6 is a top view showing that the large-sized disc is guided and then positioned according to the invention.

As shown in FIG. 6, after the drive unit 15 is enabled, the driving motor 151 rotates the gear set 152 to move the slider 153 forward. Also, the sliding plate 141 moves forward therewith, the first guide pin 1422 of the transmission bar 142 slides into the third guiding slot 1413 and slides along the third guiding slot 1413, the transmission bar 142 is rotated to drive the loading stick 143 to push the disc D into the device, and the receiving ends of the ejecting bar 163 and the positioning bar 173 are continuously pushed backward. Meanwhile, the rotation of the ejecting bar 163 moves the first driving pin 1611 of the first link 161 toward the third sliding slot 1535, and the forward movement of the slider 153 makes the first link 161 of the first driving pin 1611 release the ejecting spring 1531. When the disc D is aligned with the spindle motor 132, the sliding pin 134 of the traverse 13 rises with the lifting slot 1537 of the slider 153 (see FIG. 3) so that the spindle motor 132 clamps the disc D.

Figure 7:
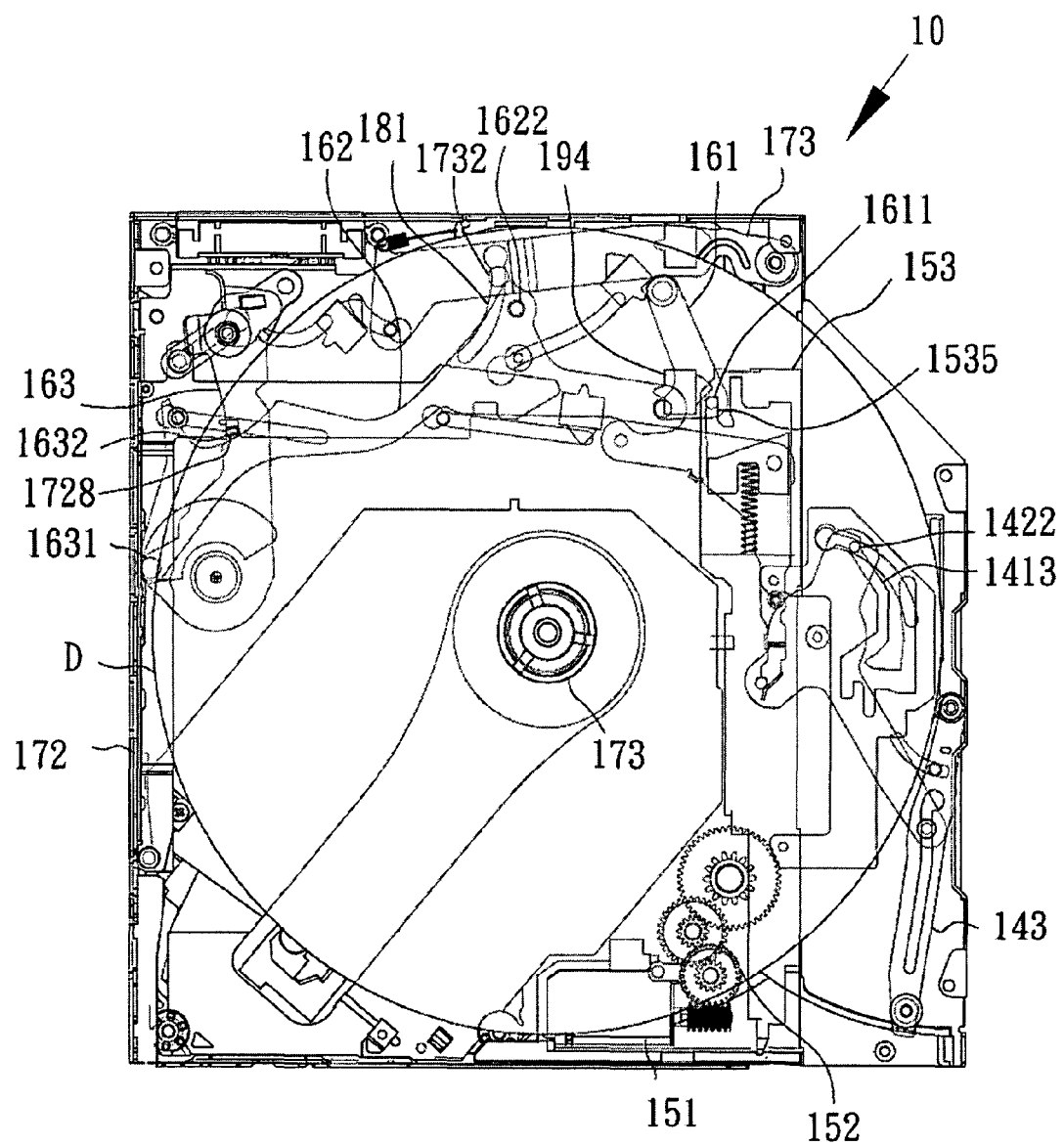
FIG. 7 is a top view showing that a guiding member is separated from the large-sized disc according to the invention.

As shown in FIG. 7, when the slider 153 continues to move forward until the rear end of the slider 153 is moved away from the fourth sensing switch 194 such that the fourth sensing switch 194 is in the OFF state, the driving motor 151 stops rotating and the slider 153 is stopped. At this time, the loading stick 143, which is influenced by the sliding position of the first guide pin 1422 along the third guiding slot 1413, moves the receiving end of the loading stick 143 away from the circumference of the disc D. The first driving pin 1611 of the first link 161 enters the third sliding slot 1535 so that the ejecting unit 16 further moves therewith, the receiving end of the ejecting bar 163 is away from the circumference of the disc D, and the bend 1632 of the ejecting bar 163 also pushes the projection 1728 of the receiving bar 172 to move toward the lateral side again and to leave the circumference of the disc D. Meanwhile, the outer periphery of the second triggering pin 1622 of the second link 162 also pushes the branch pin 1732 to slide again along the second arc slot 182. Therefore, the positioning bar 173 is away from the circumference of the disc D and cannot touch the disc D so that the spindle motor 132 is enabled to rotate the disc D.

When the ejecting button 122 is pressed (see FIG. 1), the motor 151 is enabled to reverse the gear set 152 to push the slider 153 backward. The slider 153 reverses the first link 161 and the second link 162 reverses the ejecting bar 163 so that the receiving end of the ejecting bar 163 pushes the disc D out and the power source for ejecting the disc is provided. Meanwhile, the disk drive device 10 ejects the disc according to a reversing order of the operation mentioned hereinabove. That is, as shown in FIG. 6, the ejecting bar 163 reverses to let the receiving end contact the circumference of the disc D, while the fixing pin 1631 of the ejecting bar 163 releases the receiving bar 172 so that the receiving bar 172 presses the rear circumference of the disc D when the restoring torsion spring 176 presses the restoring bar 174. Also, the second link 162 releases the second triggering pin 1622 so that the positioning bar 173 contacts the circumference of the disc D. The loading stick 143 is influenced by the sliding position of the first guide pin 1422 along the third guiding slot 1413 so that the receiving end of the loading stick 143 contacts the circumference of the disc D. Next, the traverse 13 lowers down with the backward movement of the slider 153 so that the spindle motor 132 is separated from the disc D.

Figure 8:
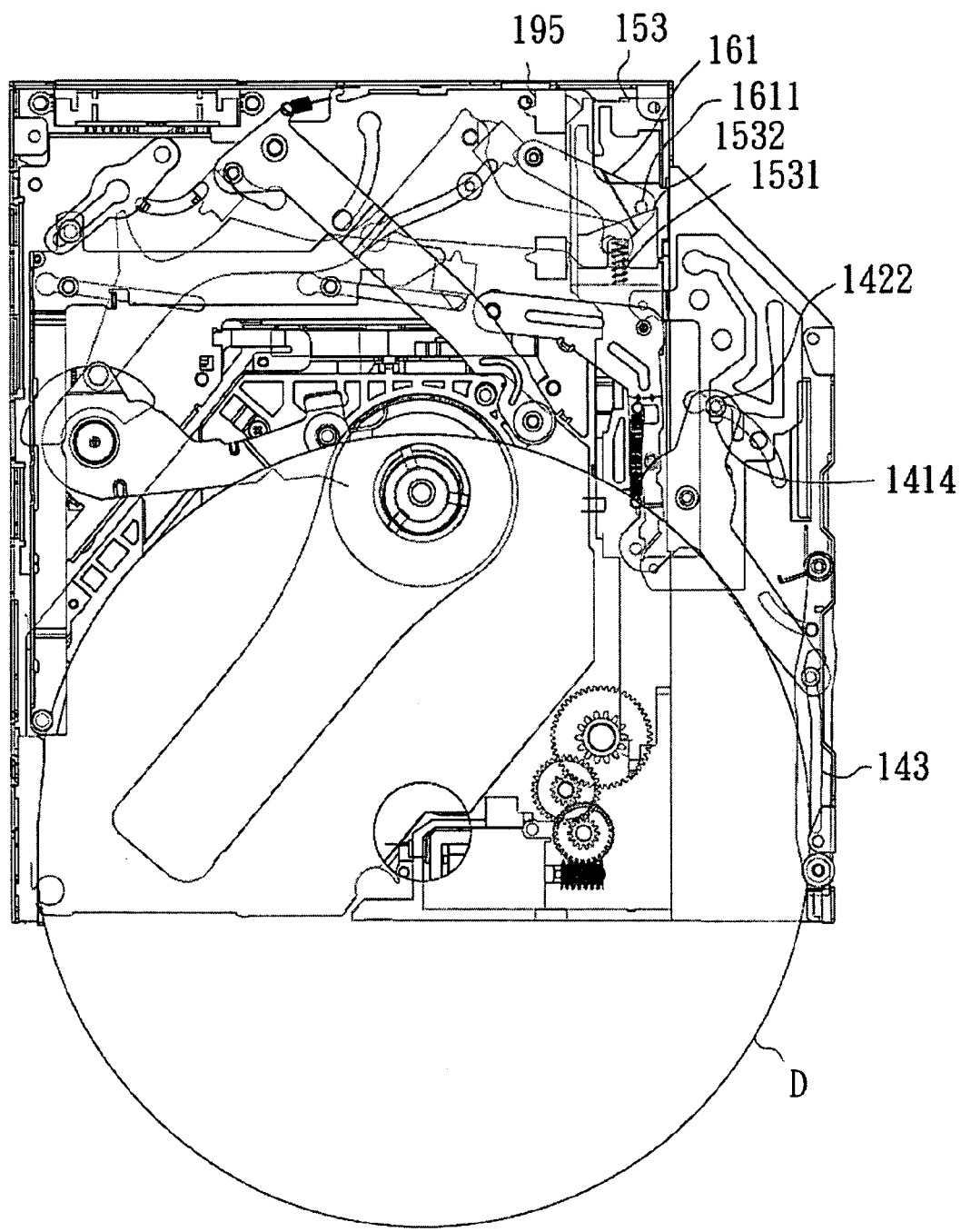
FIG. 8 is a top view showing that the large-sized disc is guided and then ejected according to the invention.

When the reversing ejecting bar 163 continues to push the disc D out, as shown in FIG. 5, the positioning bar 173 gradually restores under the action of the restoring pulling spring 1733, while the first guide pin 1422 slides out of the third guiding slot 1413 and enters the first guiding slot 1411. As shown in FIG. 8, the slider 153 continues to move backward, and the first driving pin 1611 of the first link 161 presses the slider 1532 to compress the ejecting spring 1531 until the rear end actuates the fifth sensing switch 195. Thus, the first guide pin 1422 enters the fourth guiding slot 1414 to move the loading stick 143 completely alongside so as not to block the ejecting of the disc D. As shown in FIG. 4, as soon as the fifth sensing switch 195 is in the ON state, the power of the drive unit 15 is immediately cut off, and the resilience of the compressed ejecting spring 1531 pushes the first driving pin 1611 to force the ejecting bar 163 to push the disc D out again and to force the slider 153 to move forward slightly and leave the fifth sensing switch 195, which is in the OFF state, and the first guide pin 1422 is moved back to the first guiding slot 1411. As shown in FIG. 3, when the disc D is moved away from the disk drive device 10, the receiving bar 172 slides back to the inner side of the disk drive device 10 when the restoring torsion spring 176 presses the restoring bar 174 so that the locking slot 1724 engages with the locking pin 1713 and the initial state is recovered.

Figure 9:
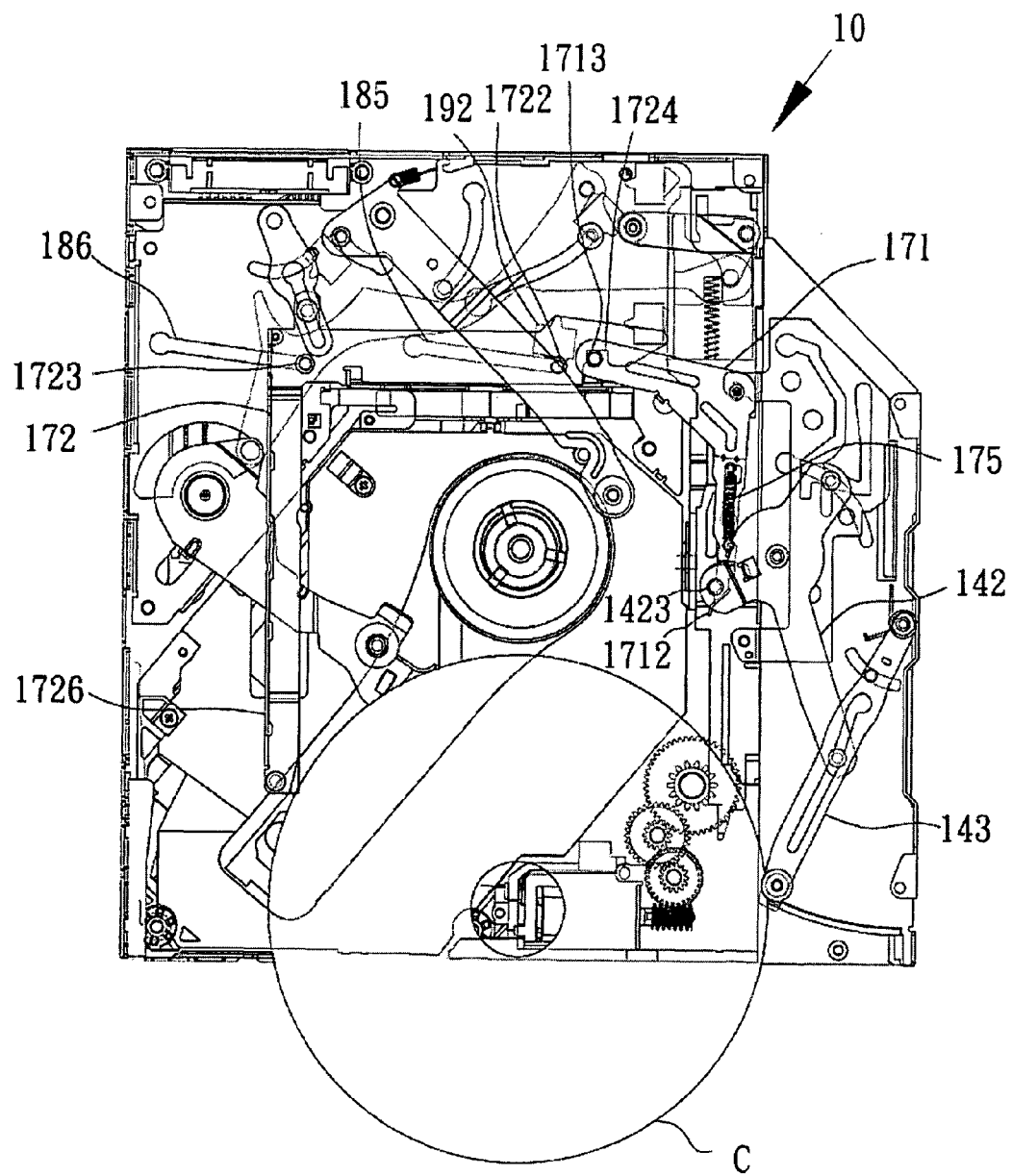
FIG. 9 is a top view showing that a small-sized disc of the invention is loaded.

As shown in FIGS. 9 to 13, the disk drive device 10 of the invention drives and guides the small-sized disc C having the diameter of 8 cm, for example, to be loaded and ejected. As shown in FIG. 9, when the disc C is inserted into the disk drive device 10, one side of the disc C moves along the receiving bar 172 flange 1726 and enters the disk drive device 10. Because the width from the flange 1726 to the loading stick 143 is slightly smaller than the diameter of the disc C, the disc C is pushed to push the receiving end of the loading stick 143 away only toward the lateral side and to rotate the transmission bar 142 by a small angle. In this case, the second guide pin 1423 cannot touch the stopper edge 1712 and the locking member 171 cannot be rotated so that the locking pin 1713 is still locked in the locking slot 1724. As a result, the first guiding pin 1722 and the second guiding pin 1723 of the receiving bar 172 cannot slide along the first inclined slot 185 and the second inclined slot 186, while the first guiding pin 1722 cannot leave the first sensing switch 191 and the first sensing switch 191 is thus kept on the ON state continuously.

Figure 10:
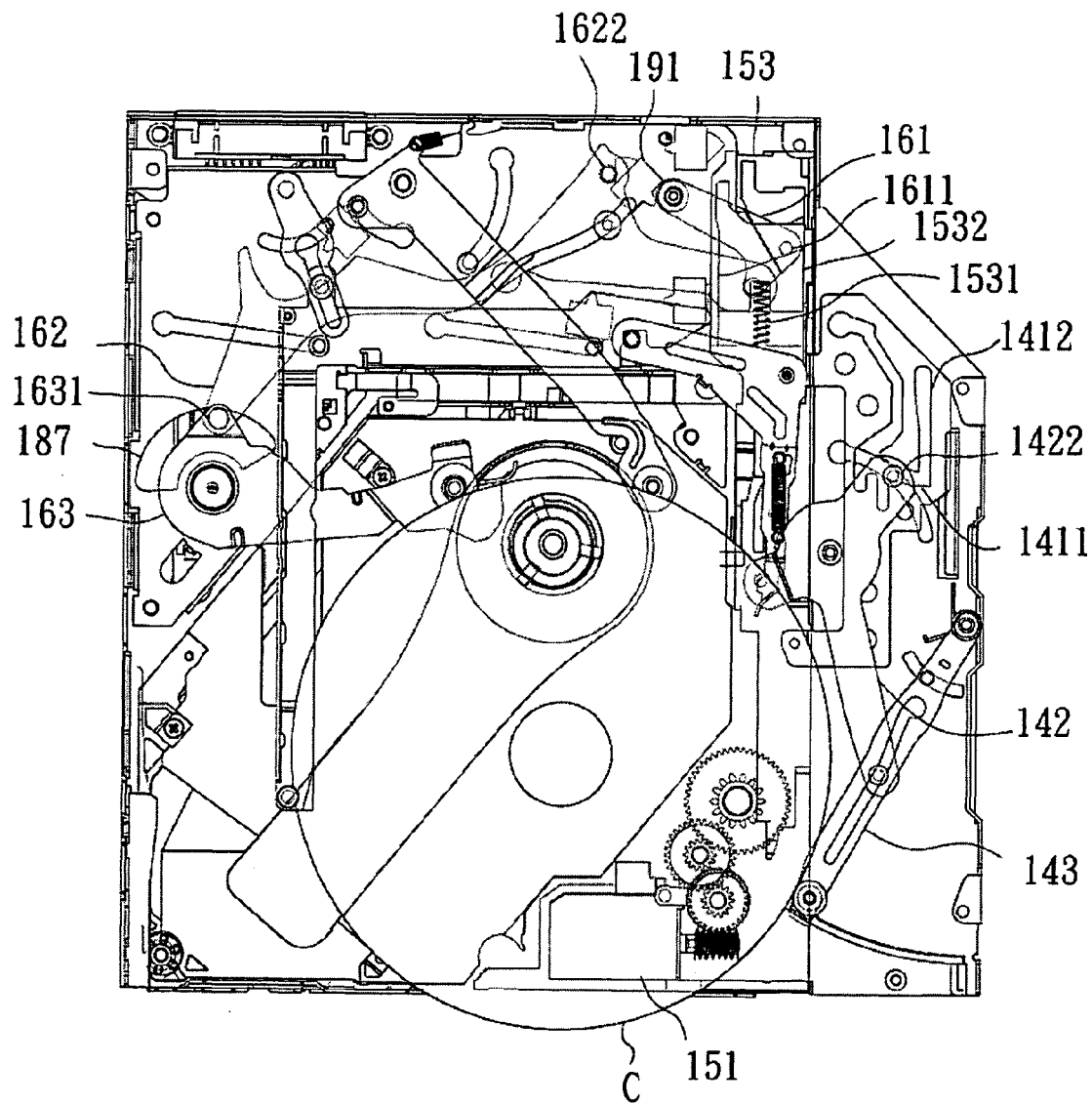
FIG. 10 is a top view showing that the driving motor is enabled to guide the small-sized disc according to the invention.

When the disc C continues to be inserted, as shown in FIG. 10, the loading stick 143 reaches the outer circumference of the disc C and is moved toward the inner side to rotate the transmission bar 142 so that the first guide pin 1422 slides to the second guiding slot 1412 along the first guiding slot 1411. The circumference of the deep side of the disc C first pushes the much more projected receiving end of the ejecting bar 163 to move backward so that the ejecting bar 163 is rotated. The fixing pin 1631 penetrates through the fan-shaped slot 187, and the second link 162 is moved so that the first driving pin 1611 of the first link 161 pushes the slider 1532 against the ejecting spring 1531 when the slider 153 is not enabled. Thus, the first link 161 is rotated to move the second link 162 so that the second triggering pin 1622 thereon is separated from the first sensing switch 191 such that the first sensing switch 191 is in the OFF state. When the second sensing switch 192 is in the ON state, it is determined that the small-sized disc C is loaded, and the driving motor 151 is enabled simultaneously.

Figure 11:
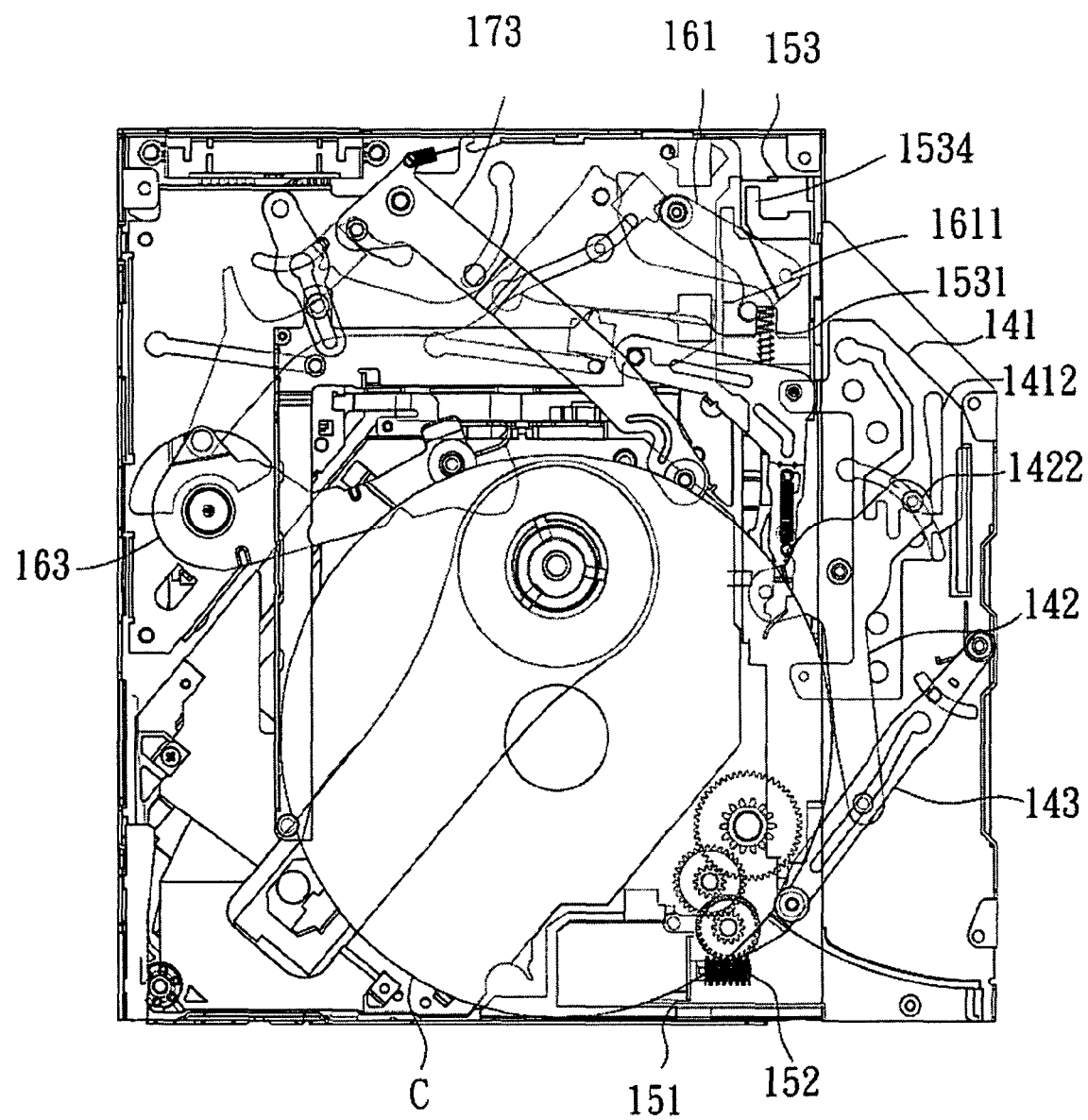
FIG. 11 is a top view showing that the small-sized disc is driven and then loaded according to the invention.
Figure 12:
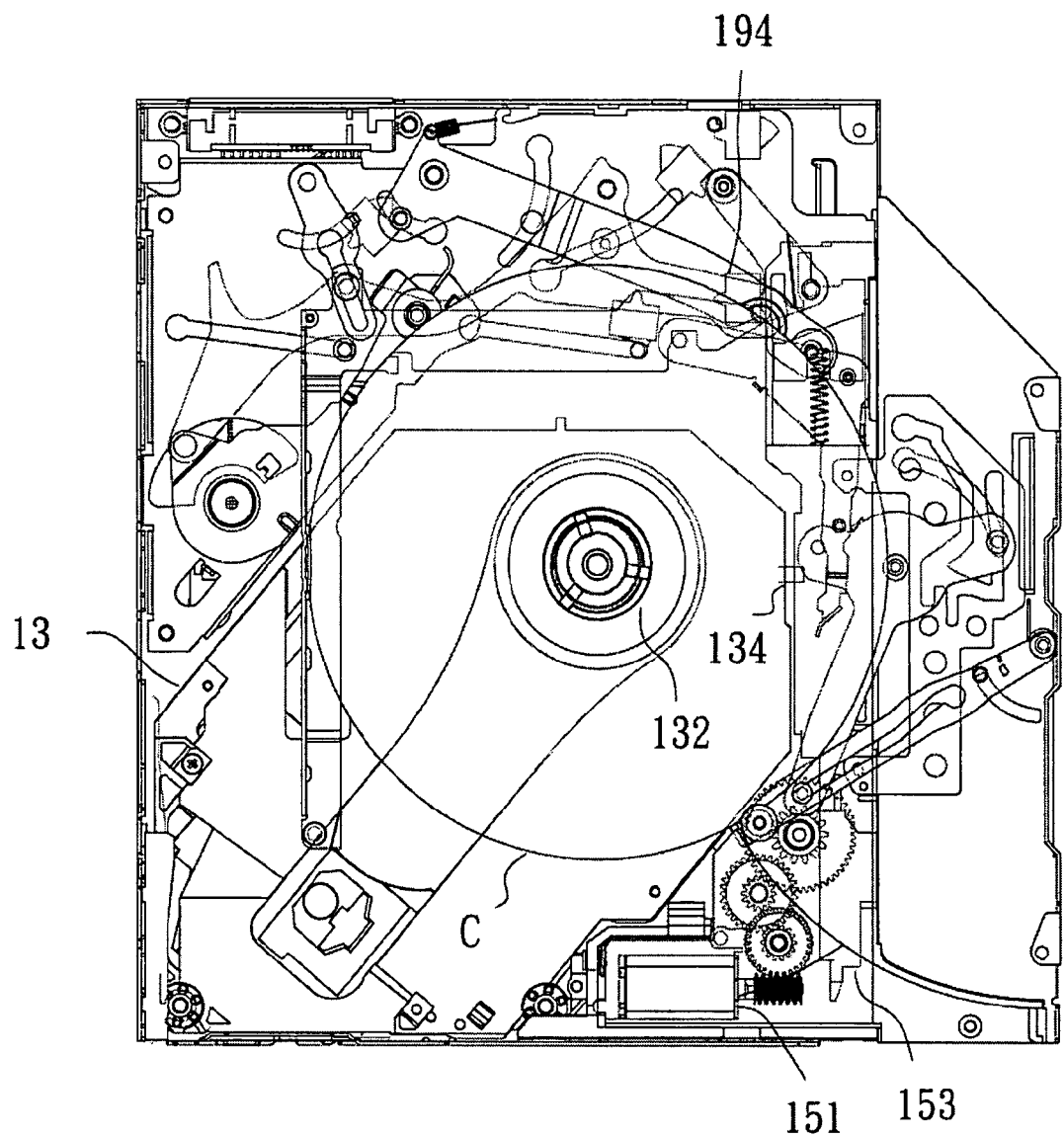
FIG. 12 is a top view showing that the small-sized disc is guided and then positioned according to the invention.

As shown in FIG. 11, after the driving motor 151 is enabled, the driving motor 151 rotates the gear set 152 to move the slider 153 forward so that the sliding plate 141 moves forward therewith and the first guide pin 1422 of the transmission bar 142 slides toward the second guiding slot 1412. The transmission bar 142 is rotated to drive the loading stick 143 to push the disc C into the device, and continues to push the receiving end of the ejecting bar 163 and the positioning bar 173 backward. Meanwhile, the rotation of the ejecting bar 163 moves the first driving pin 1611 of the first link 161 toward the second sliding slot 1534, and the forward movement of the slider 153 also causes the first link 161 of the first driving pin 1611 to release the ejecting spring 1531. As shown in FIG. 12, when the disc C is aligned with the spindle motor 132, the sliding pin 134 of the traverse 13 rises with the lifting slot 1537 of the slider 153 (see FIG. 3) so that the spindle motor 132 clamps the disc C.

Figure 13:
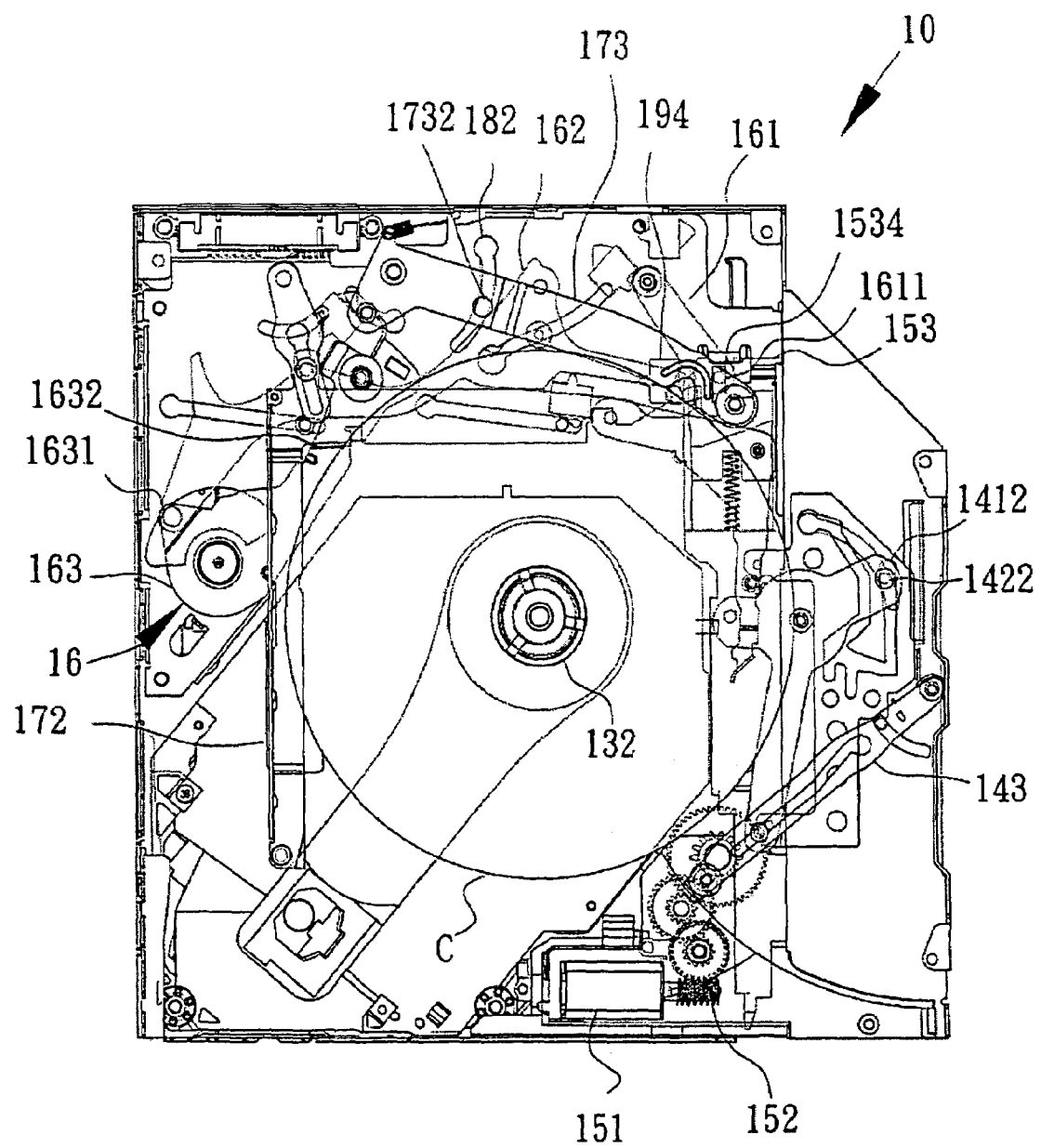
FIG. 13 is a top view showing that the guiding member is separated from the small-sized disc according to the invention.

As shown in FIG. 13, when the slider 153 continues to move forward until the rear end of the slider 153 is separated from the fourth sensing switch 194, which is in the OFF state, the motor 151 stops rotating and the slider 153 is stopped. At this time, the loading stick 143, which is influenced by the sliding position of the first guide pin 1422 along the second guiding slot 1412, moves the receiving end of the loading stick 143 away from the circumference of the disc C. The first driving pin 1611 of the first link 161 enters the second sliding slot 1534 so that the ejecting unit 16 further moves therewith, the receiving end of the ejecting bar 163 is away from the circumference of the disc C, and the bend 1632 of the ejecting bar 163 also pushes the bend of the receiving bar 172 to move toward the lateral side again and to leave the circumference of the disc C. Meanwhile, the outer periphery of the second link 162 pushes the branch pin 1732 to slide along the second arc slot 182 so that the positioning bar 173 leaves the circumference of the disc C and cannot contact the disc C, and the spindle motor 132 is enabled to rotate the disc C.

Figure 14:
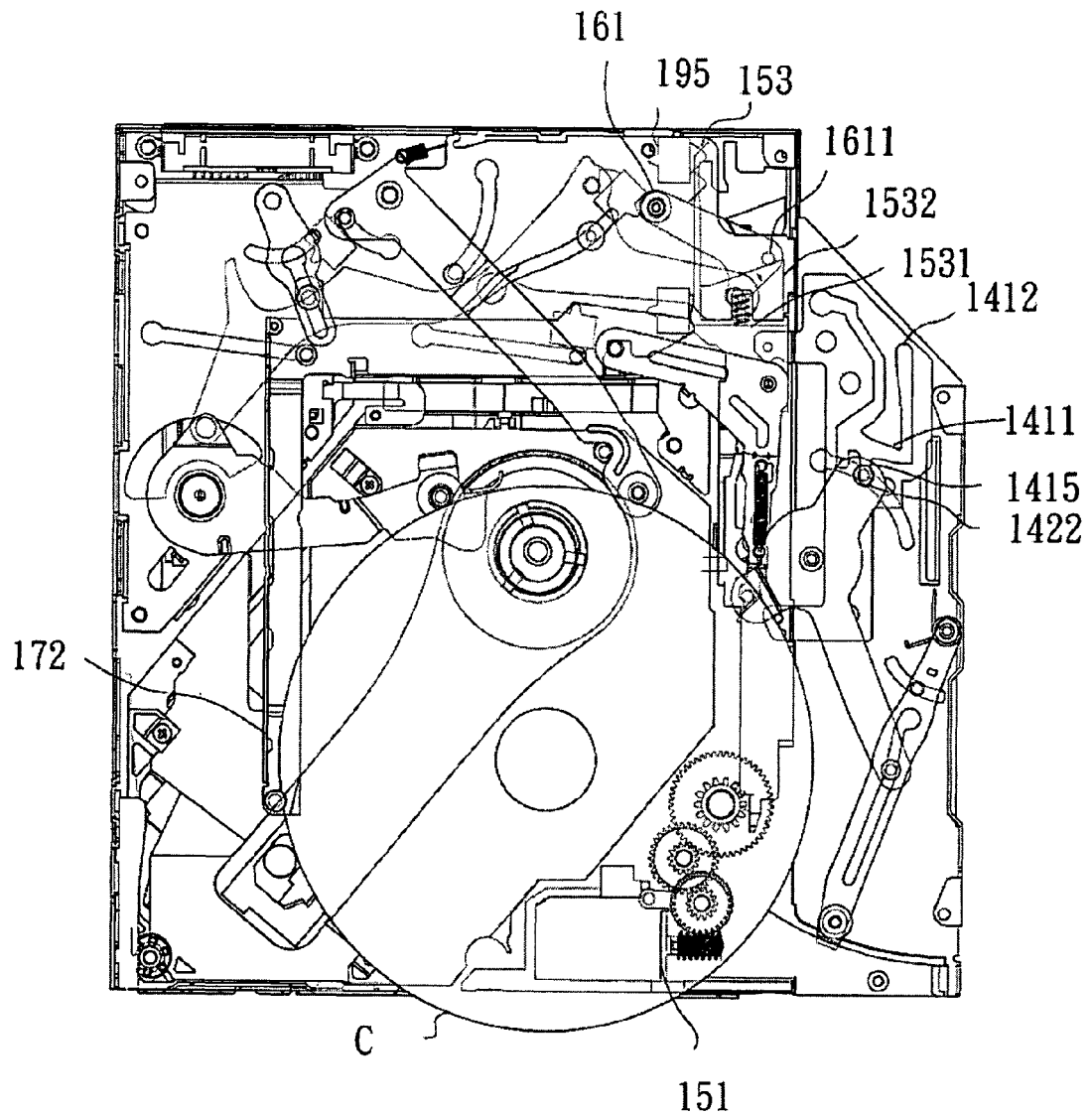
FIG. 14 is a top view showing that the small-sized disc is guided and ejected according to the invention.

When the ejecting button 122 is pressed (see FIG. 1), the motor 151 is enabled to reverse the gear set 152 to push the slider 153 backward. The slider 153 reverses the first link 161 and the second link 162 reverses the ejecting bar 163 so that the receiving end of the ejecting bar 163 pushes the disc C out and the power source for ejecting the disc is provided. Meanwhile, the disk drive device 10 ejects the disc according to the reversing order of the operation mentioned hereinabove. When the reversed ejecting bar 163 continues to push the disc C out, as shown in FIG. 14, the first guide pin 1422 slides out of the second guiding slot 1412 and enters the first guiding slot 1411. The slider 153 continues to move backward, and the first driving pin 1611 of the first link 161 presses the slider 1532 to compress the ejecting spring 1531 until the rear end actuates the fifth sensing switch 195. Thus, the first guide pin 1422 enters the fifth guiding slot 1415 and drives the loading stick 143 to move to the lateral side so as not to block the ejecting of the disc C.

Thus, the loading stick is rotated by different angles when the discs of different sizes are loaded in the disk drive device of the invention. Then, the transmission bar is driven to rotate the locking member so as to unlock or lock the receiving bar. Thus, the size of the disc can be mechanically determined, and the projecting flange of the receiving bar may be fixed at different positions for guiding the discs of different sizes, and discs of the different sizes can be precisely and stably positioned along the flange so that the disc jam is avoided and the error rate is reduced. In addition, the slider slides back and forth to move the ejecting unit of a link transmission traverse. Thus, the sufficient driving force for ejecting the disc can be transmitted, and the disc may be guided and positioned when the disc is loaded. Also, the link may be utilized to actuate the sensing switch to provide a secondary reference for determining the disc size. Meanwhile, the positioning bar is pushed away from the circumference of the disc when the positioning is finished so as no to block the rotation of the disc. Thus, one bar may have multiple functions so that the structure is simplified and the cost is reduced. In addition, the extending guiding slot is formed on the sliding plate according to the size of the disc in the invention. Thus, when the disc is ejected, the loading stick is kept alongside and away from the ejecting path so that the disc can be ejected more smoothly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in disk drive device, comprising:
   a drive unit for providing power to move a slider;
   a loading unit moving with the slider to drive a loading stick;
   a receiving bar having one end formed with a locking slot, the receiving bar sliding in the slot-in disk drive device;
   a substrate formed with a plurality of inclined slots arranged in parallel to guide the receiving bar to slide;
   a locking member rotatably mounted on the slot-in disk drive device, the locking member having one end formed with a stopper edge located on moving path of the loading unit, and the other end formed with a locking pin; and
   a pulling spring having one end fixed to the locking member so that the locking pin locks with the locking slot, wherein a rotation center of the locking member and the pulling spring are fixed to the substrate.

2. The device according to claim 1, wherein the loading unit comprises:
   a sliding plate, which has one side fixed to the slider and is formed with a guiding slot; and
   a transmission bar, which is rotatably mounted on the slot-in disk drive device and has one end formed with a first guide pin embedded into the guiding slot and a second guide pin having a moving path passing through the stopper edge, and the other end of the transmission bar moving with the loading stick.

3. The device according to claim 2, wherein the transmission bar is fixed to a tension spring.

4. The device according to claim 1, wherein the inclined slots comprise a first inclined slot and a second inclined slot parallel with each other.

5. The device according to claim 4, wherein the receiving bar has a first extending side, on which a first guiding pin and a second guiding pin are disposed, and the first guiding pin and the second guiding pin are respectively embedded into and slide in the first inclined slot and the second inclined slot.

6. The device according to claim 5, wherein when the first guiding pin penetrates through the first inclined slot, a second sensing switch on moving path of the first guiding pin is actuated.

7. The device according to claim 5, wherein the first extending side is formed with a small projection.

8. The device according to claim 5, wherein the receiving bar is formed with a second extending side parallel to a lateral side of the slot-in disk drive device and is formed with a flange.

9. The device according to claim 1, wherein the receiving bar further comprises a restoring bar having one end rotatably mounted on the substrate, the restoring bar is formed with a moving slot, into which a slide fastener extended from the receiving bar is embedded, and a restoring torsion spring supports and restores the receiving bar.

10. The device according to claim 1, wherein the drive unit comprises:
    a driving motor for providing the power; and
    a gear set rotated by the driving motor;
    wherein the slider is driven by the gear set to move back and forth.

11. The device according to claim 1, wherein the slider is further fixed to an ejecting spring, the ejecting spring has one end pressing against a slidable ejecting slider, and the ejecting slider and a rear-end wall of the slider form a sliding slot.

12. The device according to claim 11, wherein the sliding slot comprises a transversal first sliding slot and both a second sliding slot and a third sliding slot extending backward.

13. The device according to claim 10, wherein a fourth sensing switch and a fifth sensing switch are attached to rear lateral side of the slider and sense end points of disc loading and ejecting, respectively.

14. The device according to claim 10, further comprising an ejecting unit, which comprises:
- a first link having one end rotatably mounted on the slot-in disk drive device, and the other end formed with a first driving pin embedded into a sliding slot of the slider;
- a second link having one end connected to the first link; and
- an ejecting bar having one end rotatably mounted on the slot-in disk drive device and pivotally connected to the other end of the second link.

15. The device according to claim 14, wherein the second link is formed with a second triggering pin for actuating a first sensing switch.

16. The device according to claim 14, wherein the other end of the ejecting bar extends slantingly toward center of the slot-in disk drive device, and has a bend neighboring to middle portion of the ejecting bar.

17. The device according to claim 1, further comprising a positioning bar, which has one end rotatably mounted on the slot-in disk drive device and formed with a first triggering pin for actuating a third sensing switch, and the other end extending forward, and a restoring pulling spring for restoring the positioning bar is disposed neighboring to mounted end of the positioning bar.

18. The device according to claim 1, wherein a sensing unit further comprises both a fourth sensing switch and a fifth sensing switch attached to rear lateral side of the slider and respectively sensing end points of disc loading and ejecting.

* * * * *